Mar. 13, 1923.
G. H. ANTHONY
AUTOMATIC TIRE PUMP
Filed Aug. 31, 1921
1,448,248
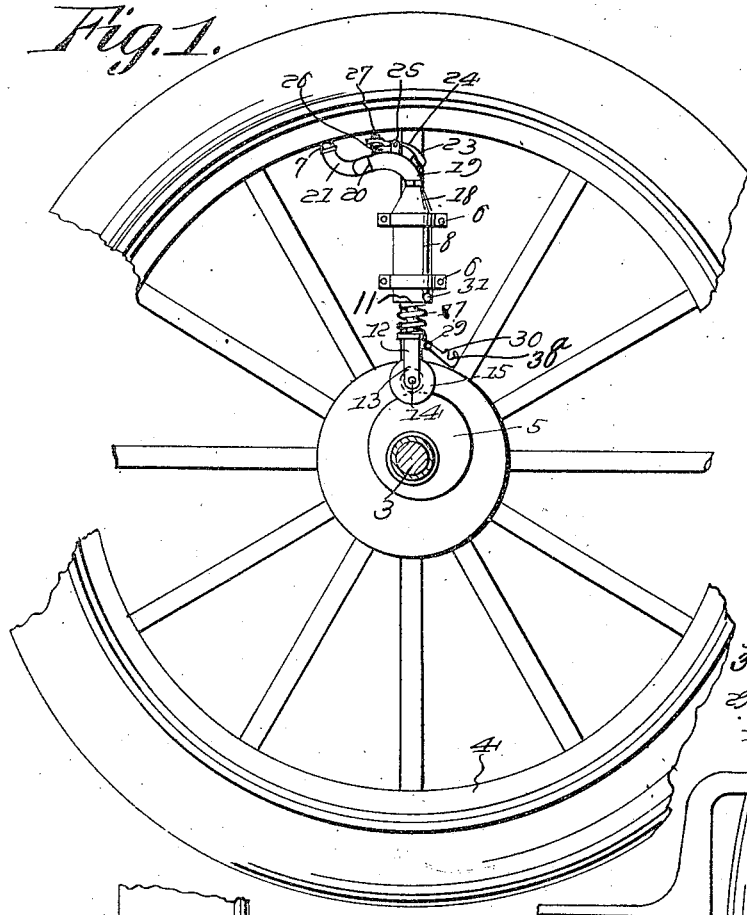
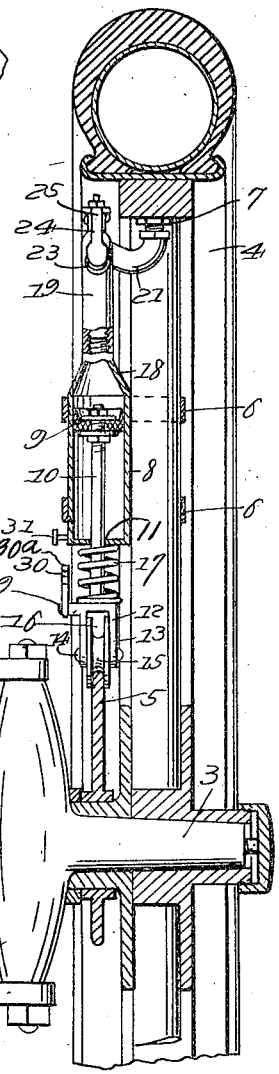
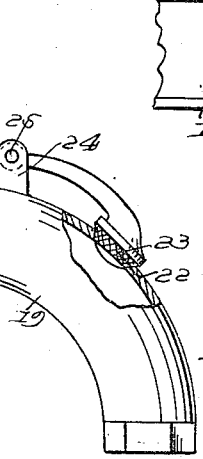
Inventor
George H. Anthony,
By Watson E. Coleman
Attorney Patented Mar. 13, 1923.

1,448,248

UNITED STATES PATENT OFFICE.

GEORGE H. ANTHONY, OF SYKESVILLE, PENNSYLVANIA.

AUTOMATIC TIRE PUMP.

Application filed August 31, 1921. Serial No. 497,164.

*To all whom it may concern:*

Be it known that I, GEORGE H. ANTHONY, a citizen of the United States, residing at Sykesville, in the county of Jefferson and State of Pennsylvania, have invented certain new and useful Improvements in Automatic Tire Pumps, of which the following is a specification, reference being had to the accompanying drawings.

It is the purpose of the present invention to provide a device of this kind for automatically keeping the tires of an automobile pumped up, while the wheels are in motion, and in order to carry this out it is the aim to provide means actuated by operative connections with a cam or other device on the axle, so as to impart reciprocating movements to the piston of the pump, in order to inject air into the tire, while the wheel is in motion.

Another purpose is the provision of safety means to relieve the excessive pressure of air, so as to avoid injecting too great a pressure of air in the tire.

Still another purpose is to provide means to hold the pumping device out of operation, after the tire has been inflated to the desired pressure.

A further purpose is the provision of means for fastening the pump to the automobile wheel, whereby the piston of the pump may operatively connect with means on the axle, so as to inject the air into the tire. It is obvious that each wheel of an automobile shall be equipped with an automatic air pumping device, so that all the tires may be kept inflated to the desired pressure.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view showing an automobile wheel and a portion of the axle, disclosing the application of the automatic pumping device constructed in accordance with the invention;

Figure 2 is a vertical sectional view through the same;

Figure 3 is an enlarged detail view showing how the piston of the pump is held out of engagement with the operating cam on the axle; and Figure 4 is an enlarged detail sectional view through the nipple which carries the safety valve.

Referring to the drawings, 1 designates the front axle of an automobile, and 2 the knuckle joint between the axle and the stub spindle 3, on which the front wheel 4 is journaled. Fixed to the spindle is a cam 5, and secured by suitable clamps 6 to one of the spokes of the wheel 4, at a point adjacent the usual inflating-valve tube 7 of the wheel is a pump, which comprises a casing 8, in which a piston 9 is mounted for reciprocating movements. The piston rod 10 passes through the end 11 of the pump cylinder or casing and terminates in a frame 12. The frame 12 is preferably U-shaped, though not necessarily, and journaled in the arms 13 thereof is a shaft 14, carrying a wheel 15. This wheel is provided with a groove 16, which is engaged by the marginal edge of the cam 5, which is carried by the spindle of the axle. Obviously the cam is eccentrically disposed, and is designed to impart reciprocating movements to the piston rod 10 of the piston. A suitable coil spring 17 is interposed between the end 11 of the pump cylinder or casing and the frame 12, and acts to hold the wheel 15 at all times in engagement with the cam 5, therefore as the wheel rotates, the cam will force the piston radially through the pump cylinder, and when the wheel engages the short part of the cam or eccentric, the spring 17 will act to withdraw the piston radially toward the center of the wheel. Obviously as the wheel rotates rapidly, corresponding movement will be imparted to the piston, for the purpose of pumping air into the tire.

The pump cylinder at one end terminates in a reduced part 18, which is threaded to a nipple 19, which in turn is connected at 20 to a tube 21, preferably of lead, though not necessarily. This tube 21 is in turn connected to the usual inflating valve tube 7, so that as the piston of the pump reciprocates, air will be forced into the tire. The inflating tube is provided with the usual check valve (not shown), but which is designed to prevent the escape of air during the return movement of the piston.

The nipple is provided with an outlet opening 22, which is provided with a valve seat for the valve 23, to be engaged by a safety valve 24. The safety valve is operatively mounted upon the nipple 19 as at 25, there being a coil spring 26 interposed between the side of the nipple and an adjusting device carried by one end of the safety valve. This adjusting device comprises a screw 27 engaged through one end of the safety valve and a screw holder 28, which is engaged by one end of the spring 26. The safety valve is designed to open when the air pressure in the tire increases, so as to relieve the excessive pressure. It is possible to adjust the screw so that the safety valve will open according to different air pressures in the tube. For instance the screw 27 may be adjusted, so that the safety valve may open at 40 pounds pressure of air in the tube, or may be adjusted to open at 45, 50 or 55 pounds of air pressure, more or less.

Pivotally mounted on the frame 12 as at 29 is a suitable latch or link 30, the hooked end 30ª of which is adapted to engage a headed pin 31 at the lower end of the pump cylinder 8, so as to hold the piston up, with the wheel 15 out of engagement with the cam or eccentric 5 on the spindle, after the tire has been inflated.

The invention having been set forth, what is claimed as being useful is:

In combination with a wheel, a cam disc carried by the hub of the wheel, a pump cylinder carried by a spoke of the wheel, a piston and piston rod slidable in the cylinder, a bracket carried by one end of the piston rod, a wheel journaled in the bracket, said wheel having a channel adapted to receive the cam disc, the opposite end of the cylinder having an outlet member, said member being connected to the valve of the tire, a pin carried by one end of the cylinder, a latch member carried by the bracket and adapted to engage the pin to hold said piston in said operative position.

In testimony whereof I hereunto affix my signature.

GEORGE H. ANTHONY.